Dec. 17, 1963 R. M. KIMBRO 3,114,385
REPLACEMENT VALVE UNIT
Filed Oct. 2, 1961
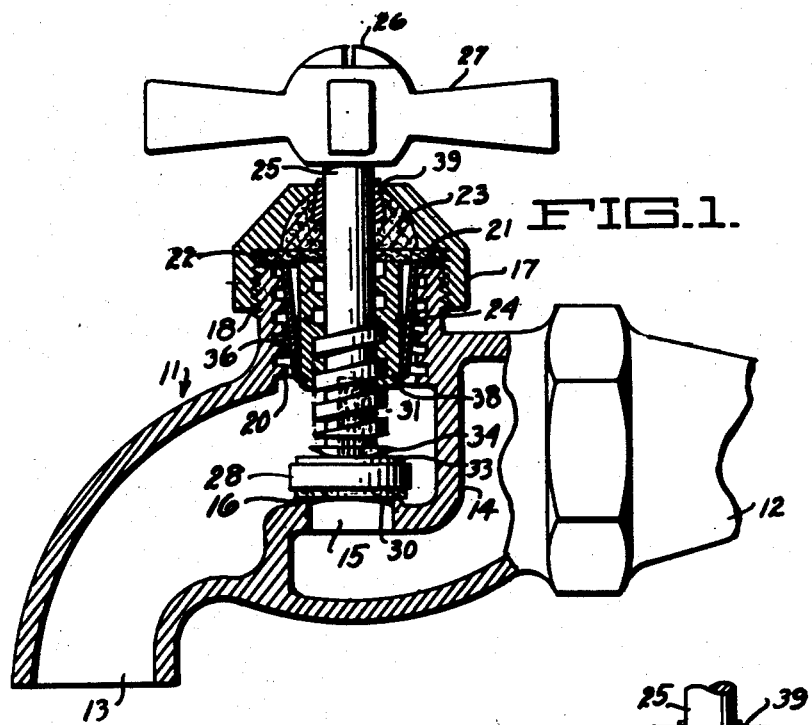
FIG.1.
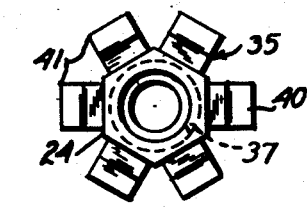
FIG.2.
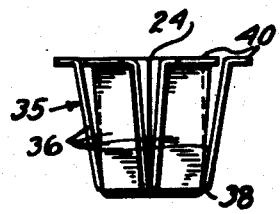
FIG.3.
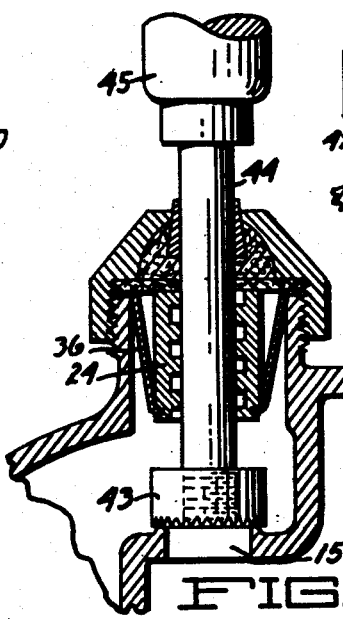
FIG.4.
FIG.5.
INVENTOR.
ROBERT M. KIMBRO
BY
Fred N. Schwend
ATTORNEY United States Patent Office 3,114,385
Patented Dec. 17, 1963

3,114,385
REPLACEMENT VALVE UNIT
Robert M. Kimbro, South San Gabriel, Calif., assignor to Kimbro Manufacturing Corporation, South San Gabriel, Calif., a corporation of California
Filed Oct. 2, 1961, Ser. No. 142,237
8 Claims. (Cl. 137—315)

This invention relates to valves and has particular reference to replacement valve units for such valves. Usually, faucet and other generally similar types of valves comprise a valve stem which is screw threaded to cooperate with screw threads on the inside of the valve body to open and close a port within the body. After extensive use, the threads of either or both the stem and the body tend to wear, requiring replacement of either the whole valve or the stem.

Since a valve body constitutes a major cost item of a valve and is often difficult to remove from attached piping, it is generally desirable to retain the valve body and replace the valve stem. However, valves of this type come in many different sizes and shapes, and the screw threads in the valve bodies also vary considerably, thus making it difficult to obtain proper replacement valve stems.

Heretofore it has been proposed to provide a replacement bushing or nut and a new stem which is screw threaded therein, which bushing is to be fitted within the original screw threaded portion of an existing valve body. However, since the inside diameters of the threaded portions of different valve bodies also vary greatly, such replacement bushings and stems would fit only a very small percentage of existing valve bodies. This would require dealers to stock a large number of different sized bushings in order to properly fit all possible valve bodies.

Another problem encountered in valves of the above type is the tendency of the relatively soft valve element or closure member to be cut or otherwise damaged due to accidental turning of the valve stem beyond the point necessary to effect proper closure of the valve port, thus requiring relatively frequent replacements of the closure member.

A principal object of the present invention is to provide a replaceable valve unit, including a valve stem, which will fit a large number of different sizes and shapes of valves.

Another object is to provide a replaceable valve unit which will automatically center itself in any of a large number of different sized valve body openings.

Another object is to reduce the possibility of damage to a valve closure member due to forcing of the valve stem beyond the point necessary to properly close a valve.

A further object is to facilitate proper seating of a valve closure member on a cooperating valve seat.

The manner in which the above and other objects of the invention are accomplished will be readily understood on reference to the following specification when read in conjunction with the accompanying drawing, wherein:

FIG. 1 is a side view, partially sectioned, of a standard faucet valve body in which a preferred form of the present invention is embodied.

FIG. 2 is a plan view of the stem nut assembly.

FIG. 3 is a side view of the stem nut assembly.

FIG. 4 is a sectional view through a second valve body, with parts broken away, incorporating a replaceable valve unit of the present invention.

FIG. 5 is a sectional view similar to FIG. 4 but illustrating a valve reseating tool guided by a stem nut assembly of the present invention.

Referring to the drawings, the invention is illustrated as installed in a standard faucet valve body 11 having an inlet 12 and a discharge nozzle 13. A partition 14 in the body has a valve port 15 formed therein and surrounded by a valve seat 16.

A bonnet or cap nut 17 is screw threaded at 18 on a tubular extension of the body 11, which extension has internal screw threads 20 therealong. The nut 17 is provided with a shoulder 21 which bears against a yieldable disc 22 to retain a packing 23.

Normally, a standard threaded valve stem (not shown) is threaded in the threads 20 and is provided with a closure element capable of closing the port 15. However, according to the present invention, when the threads 20 and/or the cooperating threads of the standard valve stem become worn, such standard stem is replaced by a replacement valve unit comprising a screw threaded valve nut or bushing 24 in which is threaded a new stem 25. The latter is attached by a clamp screw 26, at one end, to a handle 27 and is attached at its opposite end to a closure member 28 effective to engage the seat 16 and thus close the port 15.

The closure member 28 may be of any desired construction but is illustrated as having a soft valve underseat 30 of rubber or the like and a pair of resilient prongs 31 (FIGS. 1 and 4) which extend into and resiliently engage the inner surface of an axial hole 32 formed in the stem. An annular disc 33 is interposed between the valve element 28 and a frusto-spherically formed head 34 formed on the lower end of the stem.

Also, according to the present invention, the nut 24 carries a spring element 35 having radially diverging spring arms 36 engageable with the inner walls of the threaded portion 20 of the faucet body 11. The spring element 35 has a hole 37 therein which is fitted over a lower extension of the nut 24 during assembly and such lower extension is then peened or coined as shown at 38 to clamp the spring element to the nut.

The free ends of the spring arms are bent over to form outwardly extending ears 40 which lie in a common plane substantially in the plane of the upper end of the nut 24. The ears 40 have sharp corners 41 thereon. The spring arms preferably diverge outward sufficiently to form a rough circle at their upper ends which is larger than the inside diameter of the largest tubular valve extension in which the replacement unit is intended to be installed. Thus, when the nut 29 is installed the spring arms 36 will yield radially inward thereby centering the nut 24 coaxially of the port 15, regardless of the inside diameter of the threaded portion 20.

When the nut 24 is fully installed, the ears rest on top of the tubular valve extension and they are clamped in such position against turning by the cap nut 17 through the disc 22. In this condition, the upper end of the nut 24 retains the packing 23 in place within a cavity in the cap nut 21 so as to prevent leakage of fluid upwardly along the stem.

The upper end of the stem 25 is preferably guided by the cap nut 21 and in order to accommodate cap nuts having different diameter axial openings therein, a conically shaped bearing sleeve 39 is fitted over the stem. The sleeve is pressed upwardly by the packing 23 until it fits snugly in the cap nut opening. This also prevents the packing from being forced out between the stem and the cap nut.

The sharp corners 41 of the ears 40 tend to embed slightly in the upper surface of the valve body and thus aid in preventing turning of the nut.

In FIG. 4, the valve body 11a is depicted as having a smooth bore 42. This may be accomplished by boring out the threads 20 of the valve body of FIG. 1 if the replacement unit is to replace a standard valve stem or the body may be so formed initially if the valve is to be initially supplied as a complete assembly with the replacement valve unit installed therein.

It will be noted that even though the diameter of the bore 42 is larger than the inside diameter of the threads 20 of FIG. 1, the spring arms 36 are effective to properly center the nut 24. Also, because of the yieldable nature of the spring element 35, the nut 24 may yield axially a slight amount in the event the handle 27 is accidentally turned beyond the point necessary to completely shut off the flow of fluid through the valve. This materially reduces cutting or otherwise destroying the relatively soft underseat 30 of the valve element and therefore prolongs the life of the latter.

Further, the spherical head 34 enables the closure member 28 to align itself with the valve seat 16 in the event such seat is not exactly perpendicular to the axis of the stem 25 or parallel to the underseat 30. However, if the closure member cannot sufficiently align itself relative to the stem to properly fit against the seat, the spring element 35 will yield laterally sufficiently for this to take place.

FIG. 5 illustrates a valve seat resurfacing tool guided by the nut 24 of the present invention. The tool comprises a cutting head 43 which is removably attached to a shank 44 having the same diameter as the upper portion of the stem 25. The upper end of the shank is attached to a handle 45 whereby the tool may be rotated while being guided by the inner diameter of the threads of the nut 24. Accordingly the tool may be properly centered and guided regardless of the inner diameter of the bore 42 of the valve body. Thus, if the tool is supplied with the replacement stem and nut 24 it will be assured of being of the proper diameter to properly fit within the bearing formed by the threads of the nut.

Although the nut 24 is shown as being hexagonal in shape with six spring arms 36 aligned with respective sides of the nut, the nut could equally well be made into other polygonal shapes with a corresponding number of spring arms engaging the sides thereof at their lower ends. Also, the nut could be made cylindrical or otherwise.

Having thus described the invention, what I desire to secure by United States Letters Patent is:

1. A replaceable valve unit for a valve of the type having a valve body, a valve port in said body, an opening in said body for receiving a valve unit and an annular cap member screw threaded on said body and extending over said opening, comprising a rotatable valve stem for supporting a closure member in cooperative relation with said port, a nut screw threaded on said stem, and spring elements on opposite sides of said nut, said spring elements extending outwardly from said nut to engage the inner surface of said opening whereby to center said nut in said opening.

2. A replaceable valve unit for a valve of the type having a valve body, a valve port in said body, an opening in said body for receiving a valve unit and an annular cap member screw threaded on said body and extending over said opening, comprising a rotatable valve stem for supporting a closure member in cooperative relation with said port, a nut screw threaded on said stem, spring elements extending from opposite sides of said nut, said spring elements being effective to engage the inner surface of said opening whereby to center said nut in said opening, and portions of said spring elements being arranged to be clamped between said cap member and said body.

3. A replaceable valve unit for a valve of the type having a valve body, a valve port in said body and an opening in said body for receiving a valve unit, comprising a rotatable valve stem for supporting a closure member in cooperative relation with said port, a nut screw threaded on said stem, spring elements integral at one end of each thereof with said nut, said elements diverging outwardly from opposite sides of said nut to engage the surface of said opening to center said nut in said opening, and means for attaching the opposite ends of said spring elements to said body.

4. A replaceable valve unit for a valve of the type having a valve body, a valve port in said body and an opening in said body for receiving a valve unit, comprising a rotatable valve stem for supporting a closure member in cooperative relation with said port, a nut screw threaded on said stem, a spring member integral with said nut adjacent one end of said nut, said spring member comprising yieldable fingers diverging outwardly in opposite directions from said nut to engage the surface of said opening whereby to center said nut in said opening, said fingers being attachable at their outer ends to said body.

5. A replaceable valve unit for a valve of the type having a valve body, a valve port in said body, an opening in said body for receiving a valve unit for closing said port, and an annular cap member removably attached to said body over said opening, comprising a rotatable valve stem for supporting a closure member in cooperative relation with said port, a nut screw threaded on said stem, and spring elements extending outwardly from opposite sides of said nut and engageable with the inner surface of said opening to center said nut in said opening, said spring elements being formed at their outer ends to be attached to said body by said cap member.

6. A valve comprising a valve body, a valve port in said body, an opening in said body aligned with said port, an annular cap member screw threaded on said body and extending over said opening, a nut in said opening, a valve stem screw threaded in said nut and extending through said cap member, one end of said nut being adjacent said port, spring fingers integral at one end of each thereof with said end of said nut, said fingers diverging outwardly over said nut and engaging the inner surface of said opening to align said nut with said port, and outwardly extending ears on the opposite ends of said fingers, said ears being attached to said body by said cap element.

7. A valve according to claim 6 comprising a conical sleeve journalled on said stem and engaging in the opening in said cap member.

8. A bushing for rotatably supporting a stem in a valve of the type having a valve body, a valve port in said body, and an opening in said body for receiving said stem, comprising a bushing, a stem rotatable in said bushing, a spring member on said bushing adjacent one end of said bushing, said spring member comprising spring fingers extending along the length of said bushing, said fingers diverging outwardly in opposite directions from said bushing to engage the inner surface of said opening whereby to center said bushing in said opening, and radially outwardly extending ears on the outer ends of said fingers, said ears being adapted to locate against the portion of said body surrounding said opening whereby to align said stem with said port.

References Cited in the file of this patent
UNITED STATES PATENTS

| | | |
|---|---|---|
| 952,043 | Hoyt | Mar. 15, 1910 |
| 973,074 | Scaife | Oct. 18, 1910 |
| 1,315,438 | Walenter | Sept. 9, 1919 |
| 1,586,393 | Astrom | May 25, 1926 |
| 1,923,892 | Skillman | Aug. 22, 1933 |
| 2,470,470 | Carbon | May 17, 1949 |
| 3,007,671 | Bartlett | Nov. 7, 1961 |